Figure 1:
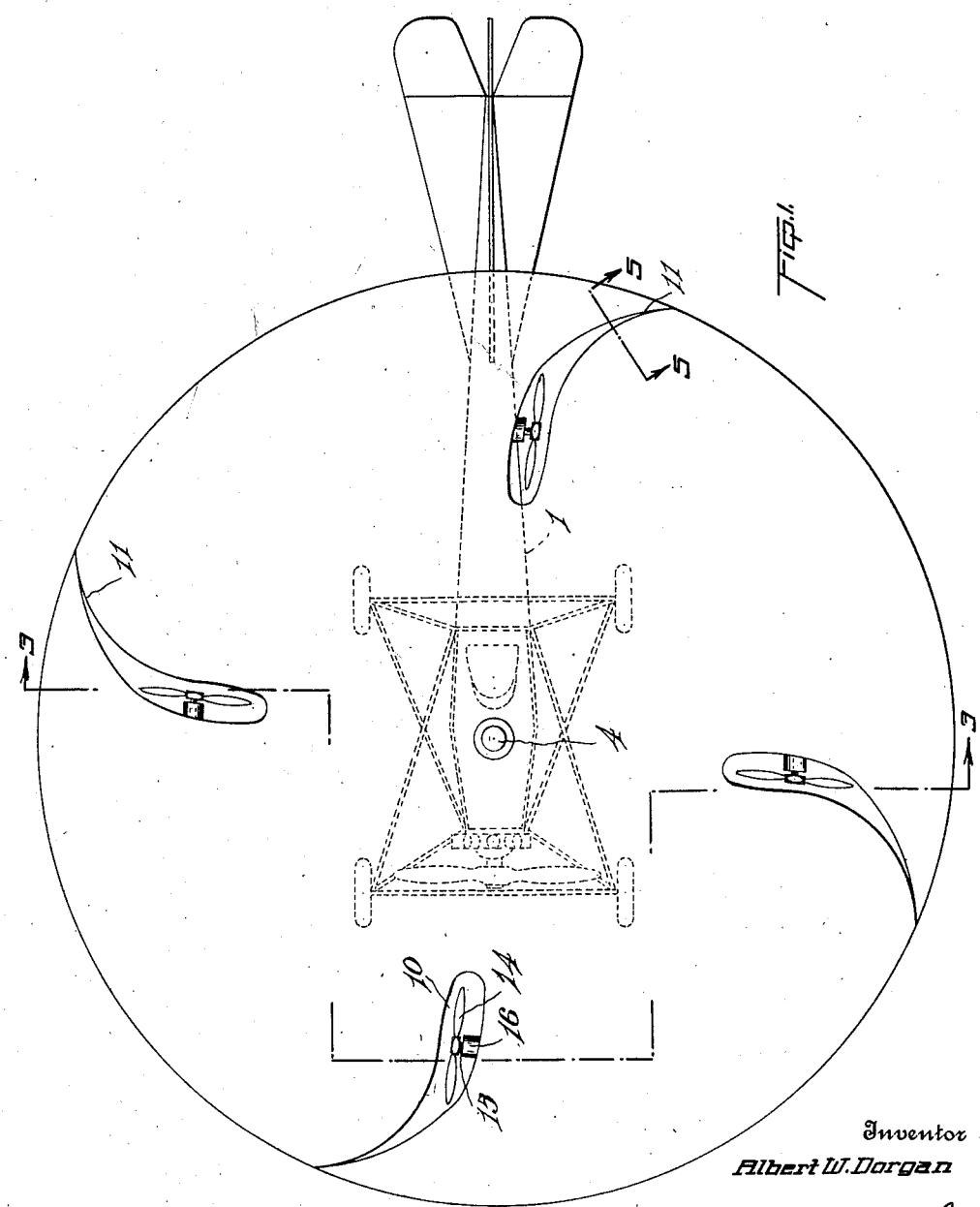

March 4, 1930.  A. W. DORGAN  1,749,572
AEROPLANE
Filed Feb. 11, 1928  3 Sheets-Sheet 1

Inventor
Albert W. Dorgan
By
Attorneys

March 4, 1930.  A. W. DORGAN  1,749,572
AEROPLANE
Filed Feb. 11, 1928   3 Sheets-Sheet 2
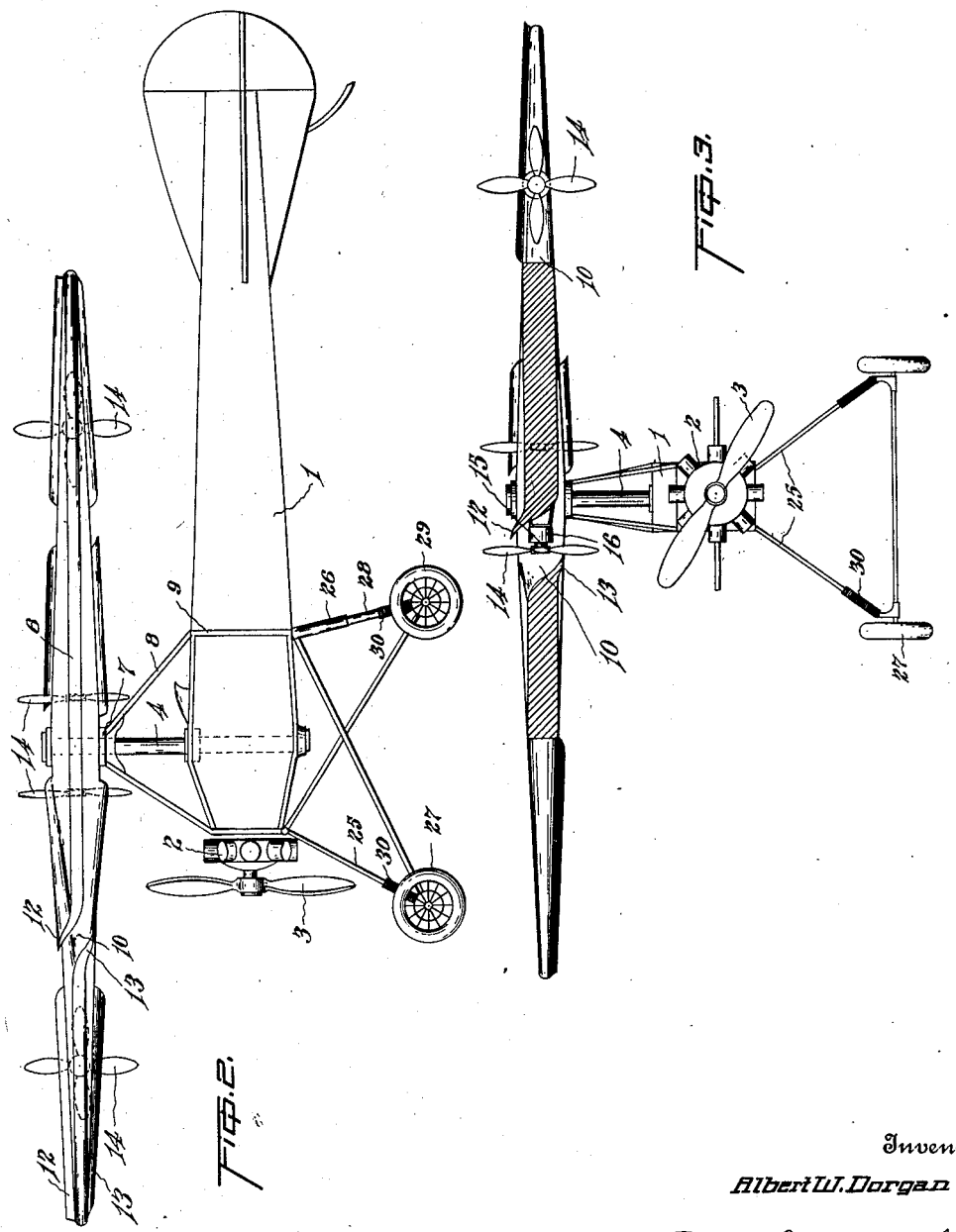
Inventor
Albert W. Dorgan
By
Attorney March 4, 1930.　　　A. W. DORGAN　　　1,749,572
AEROPLANE
Filed Feb. 11, 1928　　　3 Sheets-Sheet 3
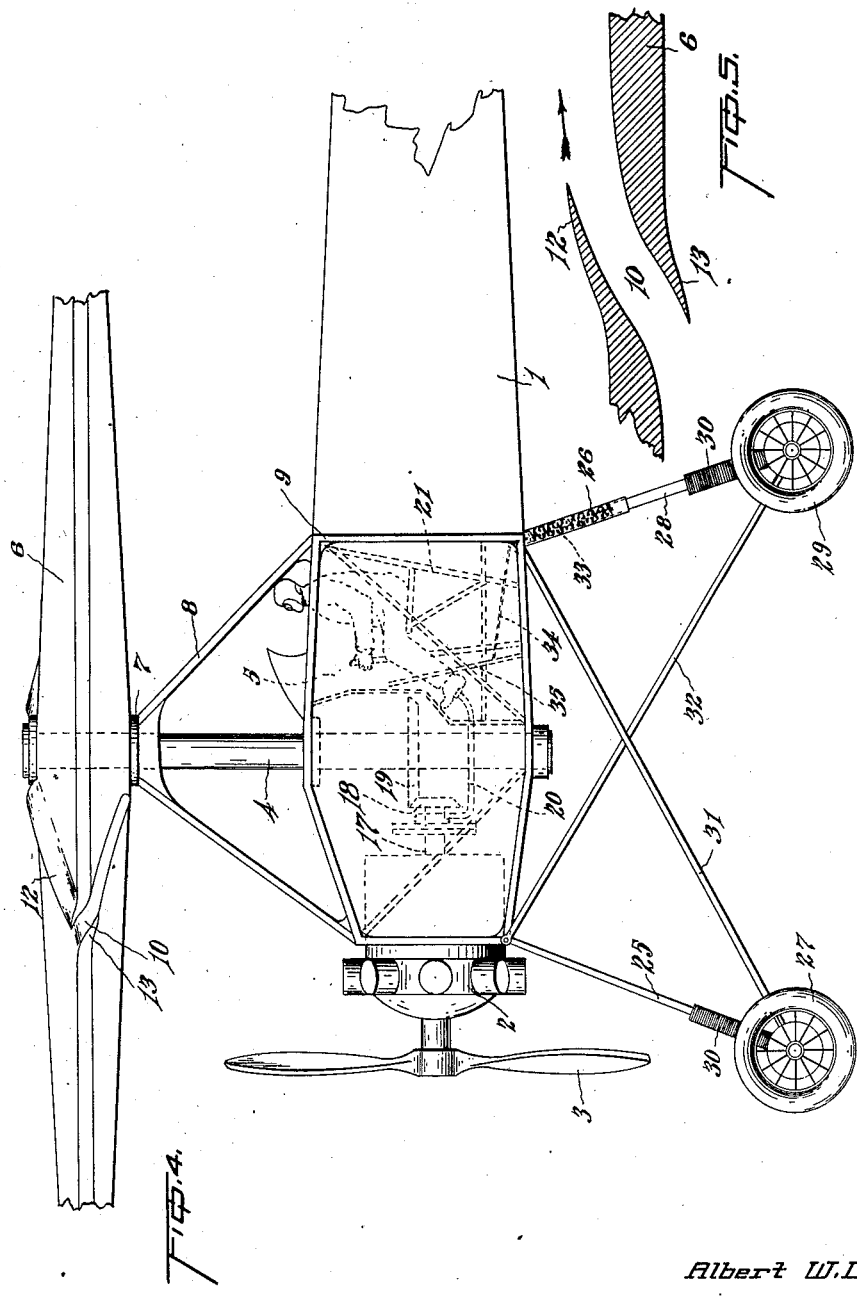
Inventor
Albert W. Dorgan
By
Attorneys Patented Mar. 4, 1930

1,749,572

UNITED STATES PATENT OFFICE

ALBERT W. DORGAN, OF BIRMINGHAM, MICHIGAN, ASSIGNOR OF ONE-HALF TO GEORGE W. YEOMAN, OF DETROIT, MICHIGAN

AEROPLANE

Application filed February 11, 1928. Serial No. 253,538.

The present invention pertains to a novel aeroplane, and the principal object is to provide an aircraft which is stabilized by an apparatus operating on the principle of a gyroscope.

This apparatus, more specifically, is in the form of a disk mounted above the fuselage and normally lying in a horizontal plane. This member is caused to revolve rapidly either by gear connections to the aeroplane motor, by an independent motor, or by small independent propellers carried by the member. The disk, revolving at high velocity, maintains the machine in a level plane regardless of sudden changes of pressure at diametrically opposite points of the disk.

The invention further comprises the formation of openings through the disk from one surface thereof to the other. When the disk is in rapid rotation, these openings operate to form a vacuum on the upper surface, whereby there is provided a force which aids the lifting of the machine.

The invention is fully disclosed by way of example in the following description and in the accompanying drawings, in which—

Figure 1 is a plan view of the machine;
Fig. 2 is a side elevation thereof;
Fig. 3 is a section on the line 3—3 of Figure 1;
Fig. 4 is a side elevation of a modification on a larger scale; and
Fig. 5 is a section on the line 5—5 of Figure 1.

Reference to these views will now be made by the use of like characters which are employed to designate corresponding parts throughout.

The machine comprises as usual a fuselage 1 having a motor 2 mounted in its lower end for driving the usual propeller 3. An upright shaft 4 is mounted in the forward end of the fuselage near the cockpit 5 and carries a circular disk 6. The shaft is loosely surrounded by a collar 7 supported beneath the disk 6 by braces 8 extending to the rigid frame structure 9 enclosing the forward end of the fuselage. The disk is supported by resting on the collar.

It will also be seen in Figures 2, 3 and 4 that the disk decreases in thickness from the center to the edge thereof, both surfaces being angular to a plane containing the edge proper. The disk is further formed with a series of substantially radial openings 10 which however have their outer ends converging and curved as at 11 towards the edge of the disk. These openings extend through both the upper and lower surfaces of the disk as shown more clearly in Figures 3 and 5. The upper trailing edge of each opening carries a lip 12 which extends upwardly and in the direction of rotation. The lower leading edge carries a somewhat similar but shorter lip 13 extending downwardly and somewhat towards the trailing edge.

In the construction shown in Figures 1, 2 and 3 the disk 6 is driven by propellers 14 mounted in the openings 10 and occupying substantially radial planes. The propellers are carried on shafts 15 extending into bearing sleeves 16 supported at the rear or trailing walls of the openings 10 and substantially perpendicular to planes passed through the propellers 14. These propellers may be driven by separate motors mounted in the disk or by gearing to the aeroplane motor 2.

In the construction shown in Figure 4 the disk 6 is driven from the motor 2. In this case the motor shaft 17 and the upright shaft 4 carry respectively a bevel pinion 18 and a bevel gear 19 in mesh. The pinion 18 may be engaged and disengaged with respect to the gear 19 by means of a suitable clutch mechanism 20 within convenient reach of the pilot's seat 21 in the cockpit 5.

In the operation of the device as thus far described, the rapid rotation of the disk 6 while the machine is sailing has a gyroscopic effect on the machine as a whole. For example, if a sudden increase in air pressure is exerted upwardly on the disk at one side of a given diameter, the machine will not tilt, but the pressure increase will act as if exerted over the entire area of the disk, and the machine will rise in a substantially horizontal plane. The openings 10, in cooperation with the lips 12, form a vacuum upon the disk while this member is rotating, and this vacuum obviously aids in raising the machine and maintaining it in the air.

The sub-structure of the aeroplane comprises a pair of forward legs 25 and rear sleeves 26 attached respectively to the forward and rear lower corners of the frame 9. The legs 25 support ground wheels 27, and tubes 28 slidably mounted in the sleeves 26 carry similar rear wheels 29. The wheels are cushioned by springs 30 surrounding the members 25 and 28 as shown more clearly in Figure 4. Intersecting braces 31 and 32 extend respectively from the forward wheels to the rear corners of the frame 9 and from the rear wheels to the forward corners of the frame and are pivoted thereto. Springs 33 disposed within the tubes 26 act upon the upper ends of the legs 28, and the latter are held in place by cables 34 extending therefrom to a lever 35 within reach of the pilot in the cockpit. It will be obvious that this lever and cable mechanism constitutes a means for regulating the effective length of the rear legs 28.

The machine is taken off the ground by first starting the motor, then rotating the disk 6, and finally shortening the legs 28 by means of the lever 34 and lowering the rear part of the fuselage. This inclination of the fuselage places the machine in better condition for leaving the ground when the motor 2 is accelerated to full speed. In landing, the forward motion is reduced to permit the plane to come close to the ground. The motion of the disk is then accelerated, and the rear end of the fuselage is lowered.

The disk 6 is mounted to turn in that direction in which its torque will be opposite to that of the main propeller 3. These torques are accurately balanced by seating the motor 2 somewhat out of line with the axis of the machine as shown more clearly in Figure 3 which illustrates the motor as offset laterally from the upright shaft 4.

Although specific embodiments of the invention have been illustrated and described, it will be understood that various alterations in the details of construction may be made without departing from the scope as indicated by the appended claims.

What I claim is:—

1. In an aeroplane, a fuselage, a disk rotatably mounted over said fuselage, said disk being supported to lie normally in a horizontal plane, means for rotating said disk, said disk having substantially radial openings from the upper to the lower surface thereof, and propellers mounted in said openings, said propellers lying in planes substantially radial to said disk.

2. In an aeroplane, a fuselage, a disk rotatably mounted over said fuselage, said disk being supported to lie normally in a horizontal plane, means for rotating said disk, said disk having openings from the upper to the lower surface thereof, and an upwardly and forwardly extending lip at the trailing upper edge of each opening.

3. In an aeroplane, a fuselage, a disk rotatably mounted over said fuselage, said disk being supported to lie normally in a horizontal plane, means for rotating said disk, said disk having substantially radial openings from the upper to the lower surface thereof, and an upwardly and forwardly extending lip at the trailing upper edge of each opening.

4. In an aeroplane, a fuselage, a disk rotatably mounted over said fuselage, said disk being supported to lie normally in a horizontal plane, means for rotating said disk, said disk having substantially radial openings from the upper to the lower surface thereof, propellers mounted in said openings, said propellers lying in planes substantially radial to said disk, forward and rear legs depending from said fuselage, wheels carried by said legs, said rear legs being adjustable in length.

5. In an aeroplane, a fuselage, a disk rotatably mounted over said fuselage, said disk being supported to lie normally in a horizontal plane, means for rotating said disk, a motor in said fuselage, a propeller mounted at the front end of said fuselage and operatively connected to said motor, the center of said propeller being offset laterally from the center of said disk with respect to the longitudinal axis of said fuselage.

In testimony whereof I affix my signature.

ALBERT W. DORGAN.